May 12, 1964     N. J. MEYER, SR     3,132,840
FLUID SEAL FOR TURBOMACHINERY
Filed Aug. 20, 1962
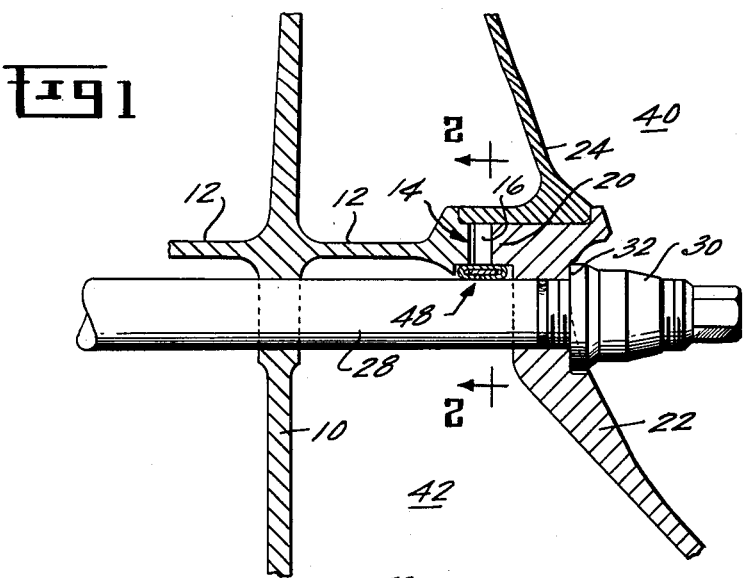
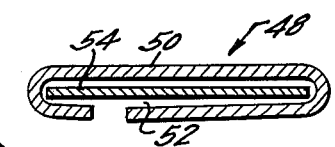
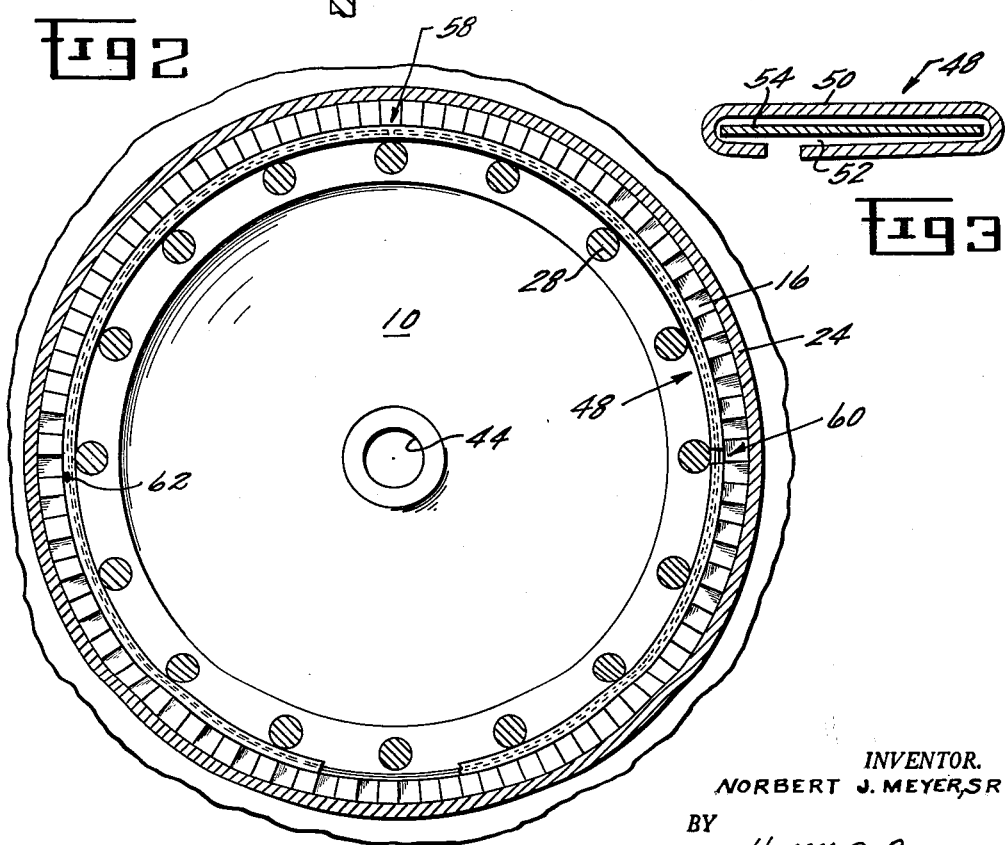
INVENTOR.
NORBERT J. MEYER, SR
BY Harry C. Burgess
ATTORNEY.

United States Patent Office 3,132,840
Patented May 12, 1964

3,132,840
FLUID SEAL FOR TURBOMACHINERY
Norbert J. Meyer, Sr., Cincinnati, Ohio, assignor to General Electric Company, a corporation of New York
Filed Aug. 20, 1962, Ser. No. 218,039
1 Claim. (Cl. 253—39)

This invention relates to turbomachinery and, in particular, to a fluid seal for use in turbomachinery rotor construction.

A power plant that has found wide usage in propelling vehicles, particularly aircraft, is a gas turbine engine, a device in which air is compressed in a rotating compressor, heated in a combustion chamber, and expanded through a turbine. The power output of the turbine is utilized to drive the compressor and any mechanical load connected to the drive. Modern, lightweight aircraft gas turbine engines, in particular, have adopted the construction of an axial-flow compressor comprising a plurality of lightweight annular disk members carrying airfoils at the peripheries thereof. The airfoils or blades act upon the fluid (air) entering the inlet of the compressor and raise its temperature and pressure preparatory to directing the air to a continuous flow combustion system. Thus, the air entering the inlet of the compressor is at a lower pressure than the air at the discharge end, the difference in pressure being known as the compressor pressure ratio. For a number of reasons having primarily to do with the design parameters of the cycle utilized in a particular engine, it is undesirable that the higher pressure, higher temperature air at the discharge end of the compressor should find its way back into the forward section of the compressor. In the case of a multistage, axial-flow compressor it has been necessary to provide some means to prevent such leakage occurring. The problem is complicated by the fact that at various operating conditions the temperatures in the compressor rotor may vary to a considerable degree, causing adjacent parts of the structure to expand and separate. The relative differential thermal expansion problem associated with this type of compressor is particularly troublesome in the area of the coupling means through which the multiple annular disks are engaged one with the other, for it is in the area of the couplings that the differential thermal expansion can have the most detrimental effect.

Accordingly, it is a primary object of the present invention to provide a sealing means for use adjacent coupling means in a multistage, axial-flow compressor wherein separation due to differential thermal expansion between adjacent coupling members is compensated for.

Briefly stated, my invention comprises sealing means for use with a multistage axial-flow compressor rotor having annular disks with face-toothed coupling means for spacing the disks along the axis of the rotor, the sealing means being located adjacent pairs of engaged coupling teeth and being able to expand or contract to accompany expansion or contraction of the related rotor parts.

It is believed that while the specification that follows clearly describes my invention, other objects and advantages thereof may become more apparent when the specification is read in conjunction with the following drawings in which:

FIGURE 1 is an enlarged fragmentary side view partially in cross section of a portion of a multistage axial-flow compressor rotor utilizing my invention;

FIGURE 2 is an end view taken along line 2 of FIGURE 1; and

FIGURE 3 is an enlarged cross sectional view of my improved fluid sealing means.

Turning now more specifically to the drawings, FIGURE 1 illustrates a portion of a multistage, axial-flow compressor rotor comprising a plurality of lightweight annular disks, one of which is indicated at 10. While the description herein concerns a disk located at the extreme end of the axial flow rotor, it is understood that each of the annular disks can generally be equally described in this manner. Thus, each disk has a pair of axially-extending, cylindrical flanges 12—12 on either side thereof. The radial end faces of the flanges, indicated generally at 14, include interengaging face-toothed couplings 16 of a type well known in the art, e.g., see the patent to Warren—3,004,032—assigned to the assignee of the present invention. In FIGURE 1, a disk flange engaging face-toothed couplings is shown located on an axially-extending flange portion 20 of a stub shaft 22, partially shown in the drawing. It is understood that a similar stub shaft to that shown in the drawing will be located at the extreme opposite end of the multistage rotor to provide a means of supporting the rotor in the bearings (not shown) of the turbomachine. In the type of construction illustrated an end baffle member 24 may also be utilized in conjunction with the stub shaft to form a primary obstruction to flow forward of the compressor, which would be to the left in the illustration. Tensioning means in the form of a tie bolt 28 may also be utilized to maintain the face-toothed coupling means in interengagement. The bolt, or bolts, may be secured by a nut 30 on the end thereof, the nut having a shoulder portion 32 which bears against the stub shaft 22.

In a multistage axial flow compressor of the type described, and particularly adapted for use in high speed, modern supersonic aircraft gas turbine engines, considerable temperature differential may exist between the inlet and the outlet air. Thus, the temperature of the air aft of the rotor, i.e., in the area indicated by 40, may differ considerably from that within the central portion of the rotor, in the area 42 just to the rear of the last stage. As indicated hereinbefore, it is undesirable that higher temperature air in the area 40 should flow forward into the inlet stages of the compressor. In the rotor construction shown in the illustrations the primary leakage path would be inwardly through the face-toothed couplings and forward through the hole 44 in the center of the lightweight annular disks, as shown in FIGURE 2. It is therefore desirable to have some means of sealing the couplings, since the baffle itself is not rigidly positioned relative to the axially-extending flange and the rotor stub shaft. Preferably the sealing means will be located adjacent the innermost portion of the disk face-toothed couplings, which will eliminate the need for sealing the center hole 44, e.g., by making the disks solid.

Referring now more specifically to FIGURE 3, it will be seen that the invention comprising the sealing means indicated generally at 48, in FIGURES 1 and 2, includes an outer member 50 in the form of a sheet-metal band bent into channel form to provide a cavity 52. The sheet-metal outer portion is circular in configuration and is adapted to enclose a resilient circular member, or band, 54 located in the cavity. Thus, the circular seal of the present invention will be seen to consist of a formed sheet-metal outer band and a circular inner member. The inner member is permitted a certain amount of movement relative to the outer member. The reason for this arrangement is to permit the seal to expand with the expansion of the adjacent coupling parts during operation of the compressor (engine) as the temperature increases with higher flight speeds.

Referring again to FIGURE 2, it will be seen that in the preferred embodiment the outer and inner members extend substantially 360° in length with the end portions of the inner and outer members indicated respectively at 58 and 60, being offset approximately 90° to prevent any interaction thereof. As shown in the drawings, the inner member may also be tack-welded at 62 to the outer member to prevent extensive rotation therein while allowing relative expansion between the seal parts. The tack-weld is preferably located approximately 180° from the gap of the outer member.

Thus, in operation, as the adjacent rotor parts expand with rising, or contract with decreasing temperatures, the fluid seal of the present invention provides a smooth bearing surface pressing against the coupling to decrease hot gas leakage into the forward portions of the rotor. The inner portion of the seal will slip within the cavity of the external band portion to allow the expansion of the seal yet at the same time permit maintaining the sealing in close contact with the couplings at all times. The seal also has the advantage of being quickly and easily installed and replaced in the event of its being damaged or worn through continued use.

What I claim and desire to obtain Letters Patent on is:

A turbomachine rotor including:
- a plurality of annular disk members spaced axially along the rotor centerline, said disk members having axially-extending circumferential flanges on either side thereof;
- a series of face-toothed couplings on each of said flanges, said couplings being engaged with like couplings on adjacent disk flanges;
- tensioning means extending through said annular disk members and maintaining said couplings in close engagement; and
- sealing means located immediately radially inward of and in substantial contact with an engaged series of flange couplings, said sealing means comprising a first resilient, sheet-metal band bent back upon itself to form an annular cavity of rectangular cross-section and a second resilient, sheet-metal band received in said cavity, each of said first and second bands being transversely split at circumferentially-spaced single locations to facilitate assembly, the inner band being attached to the inner wall of said cavity at one point to prevent substantial relative circumferential movement between said first and second bands, said sealing means effectively changing diameter under differing fluid temperatures to compensate for differential expansion of said engaged couplings so as to maintain itself in sealing contact with the couplings and prevent fluid leakage thereacross.

References Cited in the file of this patent

UNITED STATES PATENTS

| | | |
|---|---|---|
| 684,617 | Rathbun | Oct. 15, 1901 |
| 1,247,949 | Ford | Nov. 27, 1917 |
| 1,789,595 | Oven | Jan. 20, 1931 |
| 2,362,125 | Eves | Nov. 7, 1944 |
| 2,672,279 | Willgoos | Mar. 16, 1954 |
| 2,741,454 | Eppley | Apr. 10, 1956 |
| 2,819,920 | Snyder et al. | Jan. 14, 1958 |
| 3,012,802 | Waite | Dec. 12, 1961 |